United States Patent [19]
Small et al.

[11] 4,245,552
[45] Jan. 20, 1981

[54] PROTEIN TEXTURIZATION

[75] Inventors: Robert E. Small, Voorhees; William M. Hildebolt, Mickleton, both of N.J.; Murray T. Hundt, Oakvile, Canada

[73] Assignee: Campbell Soup Company, Camden, N.J.

[21] Appl. No.: 946,879

[22] Filed: Sep. 29, 1978

Related U.S. Application Data

[62] Division of Ser. No. 846,823, Oct. 31, 1977, Pat. No. 4,139,648.

[51] Int. Cl.³ ............................ A23J 1/00; A23J 3/00
[52] U.S. Cl. ........................................ 99/483; 99/474; 99/477; 99/516; 99/536
[58] Field of Search ................... 99/348, 450.1, 450.2, 99/516, 483, 462, 477; 426/802, 507, 506, 511, 516, 517, 641, 656, 657; 425/72 R, 202, 205, 378 R, 379 R; 260/112 R; 264/95, 99, 82, 83, 202

[56] References Cited

U.S. PATENT DOCUMENTS

| 3,778,522 | 12/1973 | Strommer | 426/511 |
| 3,800,053 | 3/1974 | Lange | 426/459 |
| 4,039,691 | 8/1977 | Hildebolt | 426/511 |
| 4,062,987 | 12/1977 | Hildebolt | 426/511 |
| 4,095,001 | 6/1978 | Hildebolt et al. | 426/511 |

Primary Examiner—Harvey C. Hornsby
Assistant Examiner—Timothy F. Simone
Attorney, Agent, or Firm—Schuyler, Banner, Birch, McKie and Beckett

[57] ABSTRACT

A bland protein product having a texture and mouth feel simulating animal meat is prepared from a dough-like mixture of proteinaceous material and water. The proteinaceous material can comprise relatively low protein content blends or even single ingredients such as soy flour. The process comprises continuously extruding the protein dough in the form of a relatively thin sheet of semi-rigid protein material into a first confined treating zone while simultaneously subjecting the thin sheet in the extrusion die to externally applied heat to texturize both surfaces of the sheet before it enters into the first confined zone. A stream of heated gas and condensables is introduced into the first confined zone to buoy up, flex and help propel the sheet of surface-texturized protein through the confined zone where additional texturization takes place. The sheet then is cut into segments by rotating longitudinal knife edges against a stationary straight edge and the segments are conveyed through a second confined zone where final texturizing takes place. Finally, the protein segments are passed through a suitable back pressure means at the end of the second confined zone, and recovered in usable form. Apparatus for performing this process is also disclosed.

9 Claims, 23 Drawing Figures

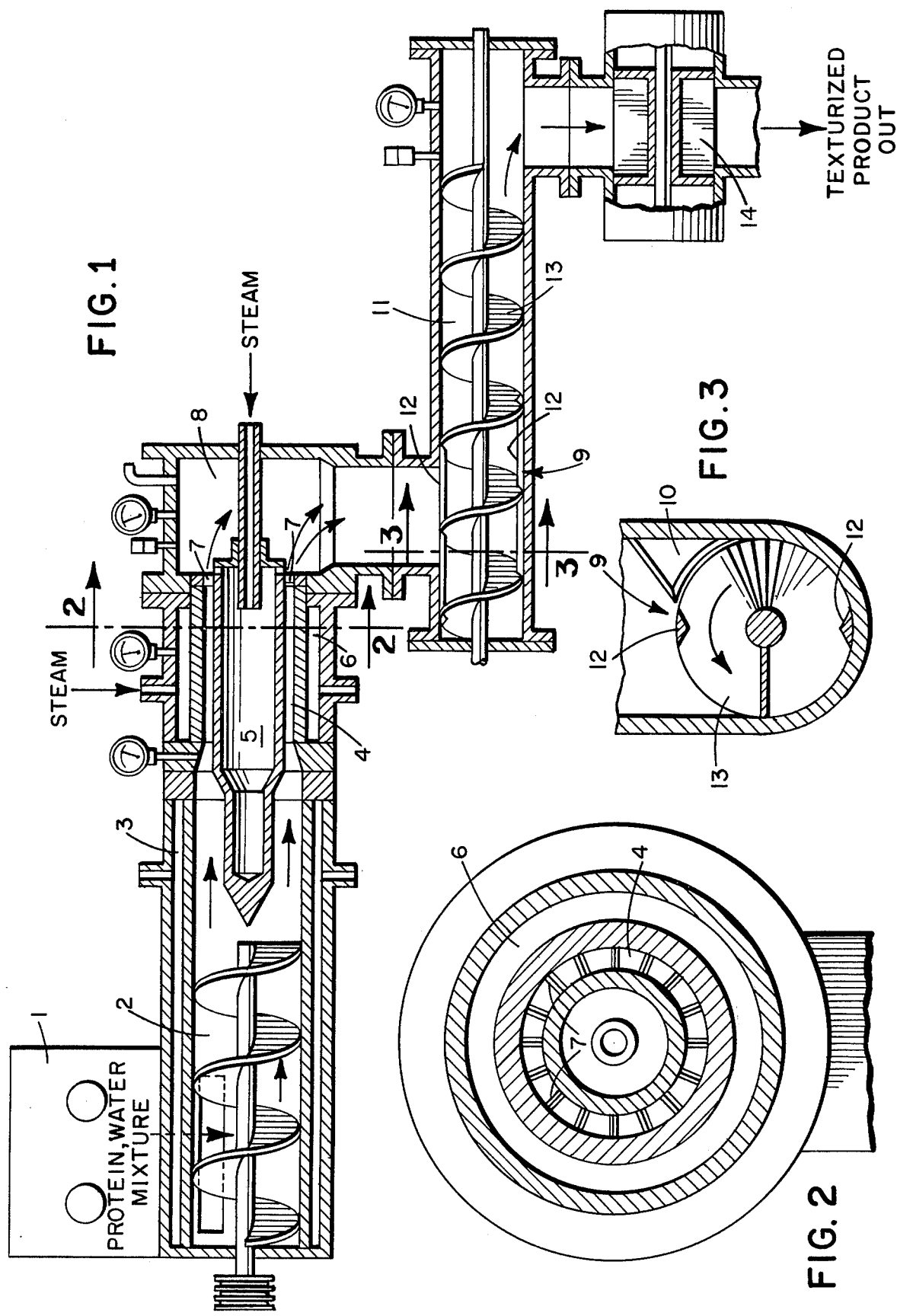

PROTEIN TEXTURIZATION

This is a division of application Ser. No. 846,823, filed Oct. 31, 1977, now U.S. Pat. No. 4,139,648.

BACKGROUND OF THE INVENTION

1. Field of the Invention

This invention relates to the treatment of untextured protein materials to form a product possessing the fibrous texture and mouth feel properties of animal meat.

2. Description of the Prior Art

The food industry has spent much effort over a span of many years and has expended large sums of money in an attempt to utilize non-meat proteins, such as those derived from vegetables, as additives to or substitutes for animal meat products. It long has been recognized that the ever-increasing worldwide food shortage could be in material part obviated if only such relatively inexpensive materials could be converted into products so closely approximating the naturally occurring food material that public acceptance would be achieved. One of the major roadblocks encountered by the industry has been the inability to impart the natural and accustomed chewy, fibrous texture to vegetable protein materials. Animal meat products inherently possess a texture giving them a definite "mouth feel" which is clearly recognized and strongly preferred. Vegetable proteins in their natural state generally take the form of amorphous powders which, despite their unquestioned nutritive value, possess mouth feel characteristics wholly unacceptable to the consumer as a meat substitute. Moreover, vegetable proteins normally are characterized by objectionable "beany" flavors which the industry has been unable to remove or mask.

In recent years a number of processes and apparatus have been developed for treating vegetable protein material to produce a bland texturized product. None of these processes, however, has achieved any substantive measure of commercial success.

The first generation of these prior art techniques involved the wet spinning process disclosed in Boyer, U.S. Pat. No. 2,730,447. This process produces a fibrous product by extruding a plurality of fine streams of an aqueous solution of protein into a chemical coagulating bath. The protein coagulates into fine fibers which are collected together and treated to form an adible textured protein product. The wet spinning process suffers from a number of drawbacks in addition to its general failure to produce an adequately textured product as discussed above. The equipment employed to perform this process is extremely sophisticated for the food industry and represents a very high initial cost problem. Adding further to the economic infeasibility of the product produced by the wet spinning process is the expensive starting materials which must be employed. Moreover, product uniformity is difficult to achieve due to the general complexity of the process and the numerous parameter control problems presented.

The second generation technique advanced in this area is the extrusion cooking process disclosed in Atkinson, U.S. Pat. No. 3,488,770 in which a protein mass is subjected to severe physical working at an elevated temperature and thereafter extruded at an elevated temperature and pressure through an orifice into a medium of lower pressure and temperature. This process suffers from high equipment costs and is extremely energy intensive due to the extreme temperature and pressure requirements. In addition, the product produced by extrusion cooking has a very low density which swells up in water to give a "spongy" texture. Moreover, the product contains objectionable flavor notes in addition to the "beany" flavor originally present in the starting materials which are apparently imparted to the product by the severe processing steps. Other patents demonstrating the current state of the art in respect to the extrusion texturing approach include Hale, U.S. Pat. No. 3,447,929; Jenkins, U.S. Pat. No. 3,496,858; Anker, U.S. Pat. No. 3,684,522; Strommer, U.S. Pat. No. 3,778,522; Lang, U.S. Pat. No. 3,800,053; Atkinson, U.S. Pat. No. 3,812,267; and Yang, U.S. Pat. No. 3,814,823.

The third generation of development in the protein texturization involves the use of steam as the texturizing medium. Exemplary of this approach are Strommer, U.S. Pat. Nos. 3,754,926 and 3,863,019 which treat either finely divided protein particles or slurries with steam and Heusdens U.S. Re. Ser. No. 28,091 which employs a steam treatment of protein slurry following complex hydration steps. Products produced by these processes also possess the general problems of poor texture and flavor discussed above. In addition, the product has low density problems similar to the second generation extrusion cooked products in that on hydration they tend to be very soft. The product is also extremely friable.

Other attempted solutions by the art include cooking and shaping of a protein dough disclosed in McAnelly, U.S. Pat. No. 3,142,571, and the heat coagulation of undenatured protein disclosed in Rusoff, U.S. Re. Ser. No. 27,790.

Notwithstanding the veritable plethora of prior art attempts to satisfactorily texturize vegetable proteins—no one to date has made any really substantial progress toward the desired goal. The present absence from the market of any commercially accepted consumer products based on vegetable protein demonstrates clearly that the problems involved simply have not been solved. Indeed, those meat analog products which have found their way to the supermarket shelves generally have been met with little or no consumer acceptance and have generally been withdrawn. Especially in the United States, where consumer preferences rather than nutritional values often dictate the fate of food products, a successful texturized vegetable protein material simply must possess taste and mouth feel characteristics similar to natural meat. In addition, the prior art processes generally have employed such complex apparatus and procedures that initial equipment and operating costs have made protein analog products economically unattractive to manufacturers, despite the relatively inexpensive nature of the raw product.

Given the ever-increasing fears of worldwide famine and the diminishing availability of animal meat protein products, it is clear that an inexpensive, consumer-acceptable, high protein food product based on texturized vegetable proteins is urgently needed.

BRIEF SUMMARY OF THE INVENTION

It is the object of the present invention to provide a process and apparatus for texturizing protein which fulfills the need left by the prior art texturizing processes.

More specifically, it is an object of the present invention to provide a process and apparatus for producing thin discrete segments of relatively dense protein material having a fibrous texture simulating that of natural meat.

It is a further object of the present invention to provide a process and apparatus which will produce a bland flavored protein product.

Another object of the present invention is to provide a process and apparatus which will produce a retort stable protein product.

It is also an object of this invention to provide a texturizing process and apparatus which will produce such a product at a much lower cost due to lower initial equipment costs and lower energy requirements.

It is also an object of the present invention to provide a high quality texturized protein product from relatively inexpensive, low protein starting materials.

Accordingly, the present invention comprises a method for producing a relatively dense texturized protein product with a unidirectional laminated surface structure comprising mixing untextured protein material and water to form a protein dough, said dough containing from about 60 to 73% solids; advancing said dough to an extrusion die at a temperature below that at which texturization takes place; continuously extruding said dough in the form of a thin sheet of protein material through said extrusion die while simultaneously texturizing both surfaces of said thin sheet as it passes through said die by applying heat to both surfaces of said sheet from a source external the die walls; passing said extruded sheet in unbroken form directly into a first confined treating zone while simultaneously introducing a heated gaseous stream into said first confined treating zone, whereby said unbroken extruded sheet is buoyed up and flexed by said gaseous stream and said unbroken extruded sheet is further texturized as a result of the extended exposure to the conditions in said first confined zone; cutting said unbroken extruded sheet into segments as it reaches the end of said first confined treating zone; conveying said cut segments through a second confined treating zone communicating with said first confined treating zone, whereby the protein segments are further texturized; passing said protein segments through means for maintaining back pressure disposed at the discharge end of said second confined treating zone; and recovering the texturized protein segments.

The present invention further provides apparatus for texturing protein material comprising die means for extruding a continuous, relatively thin sheet of semi-rigid protein material; means for externally applying heat to both surfaces of said thin sheet as it passes through said die means to effect surface texturization of said thin sheet; means defining a first confined treating zone communicating with said die means; means for introducing a heated gaseous stream into said first confined zone; means for cutting said extruded sheet into segments disposed at the discharge end of said first confined treating zone; means defining a second confined treating zone communicating with said first confined treating zone; and means for recovering said texturized protein material.

BRIEF DESCRIPTION OF THE DRAWINGS

FIG. 1 represents a schematic of one embodiment of the apparatus of the present invention.

FIG. 2 is a sectional view taken along lines 2—2 showing the slitting means at the discharge from the die assembly.

FIG. 3 is a sectional view taken along lines 3—3 showing the cutting means at the discharge end of the first confined treating zone.

DETAILED DESCRIPTION OF THE INVENTION

Figure 4:
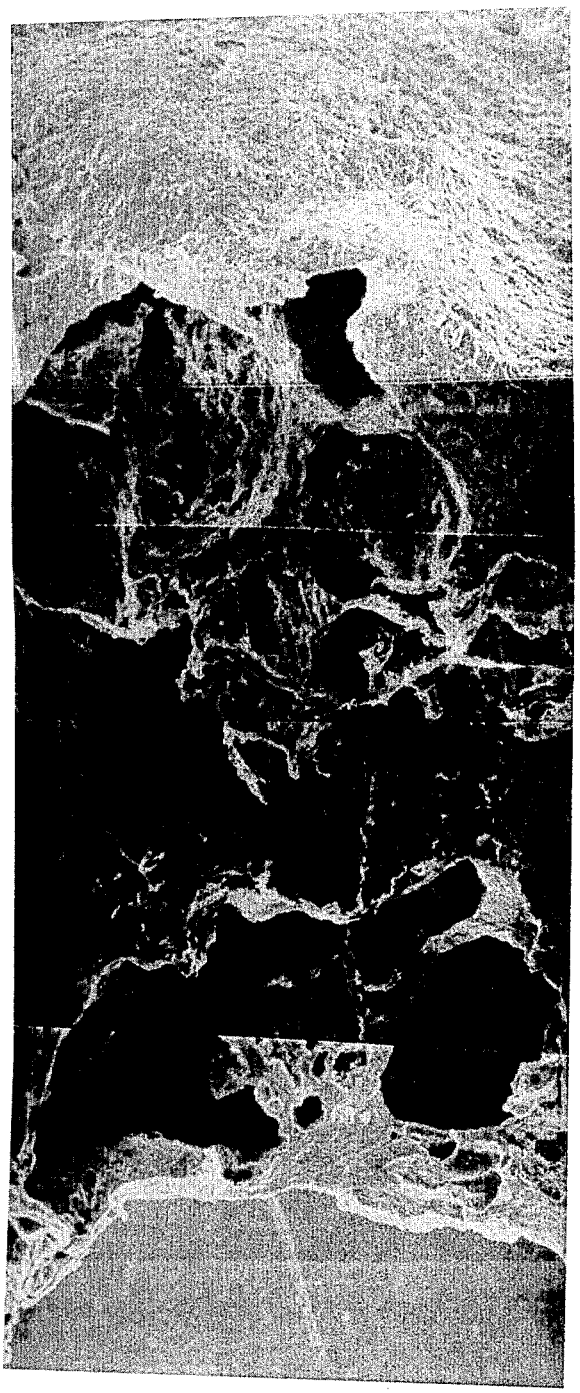
FIG. 4 is a photomicrograph of a section of the product produced by the present invention, observed at 50X.
Figure 5A:
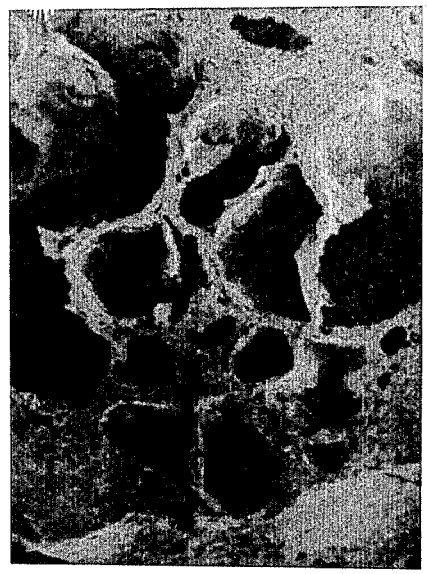
FIG. 5 represents a series of photomicrographs of an interior section of the product produced by the present invention; 5a is at 25X; 5b at 50X; 5c at 100X; 5d at 300X; 5e at 500X; 5f at 1000X; and 5g at 1500X.
Figure 5B:
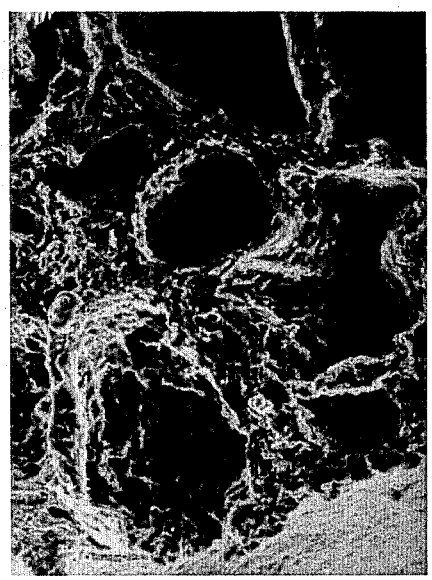
Figure 5C:
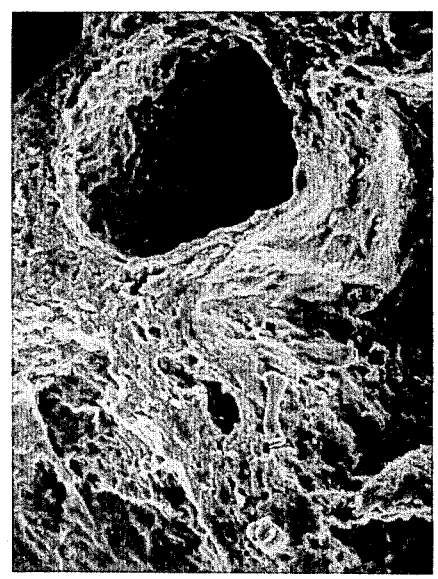
Figure 5D:
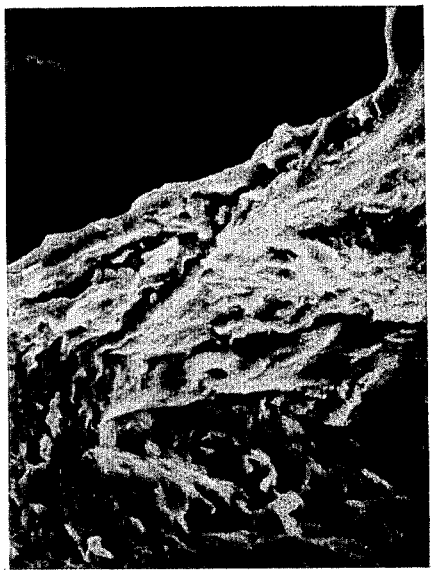
Figure 5E:
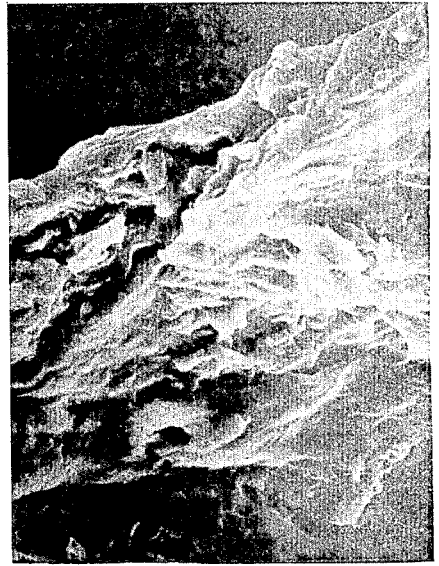
Figure 5F:
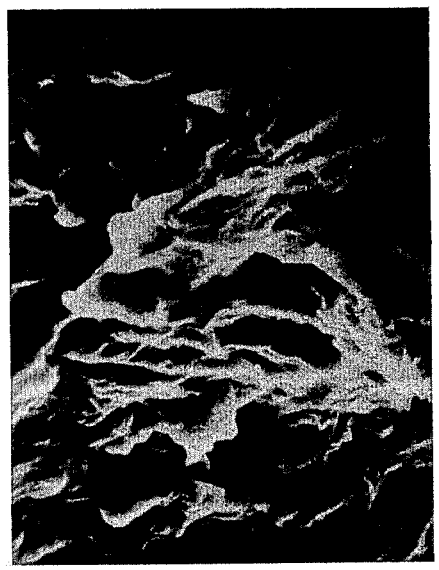
Figure 5G:
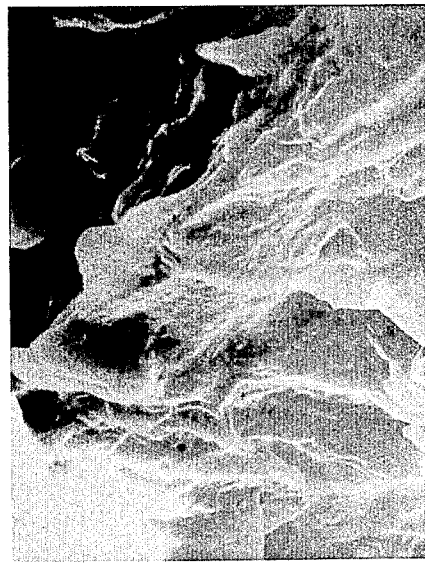
Figure 6A:
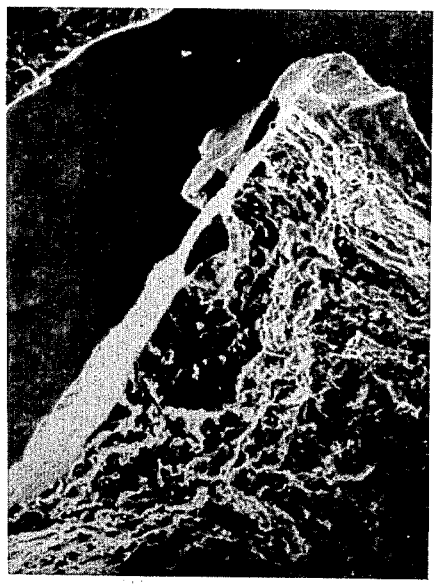
FIG. 6 represents a series of photomicrographs of an exterior section; 6a is at 50X; 6b is at 100X; 6c at 300X; 6d at 500X; 6e at 1000X; and 6f at 1500X.
Figure 6B:
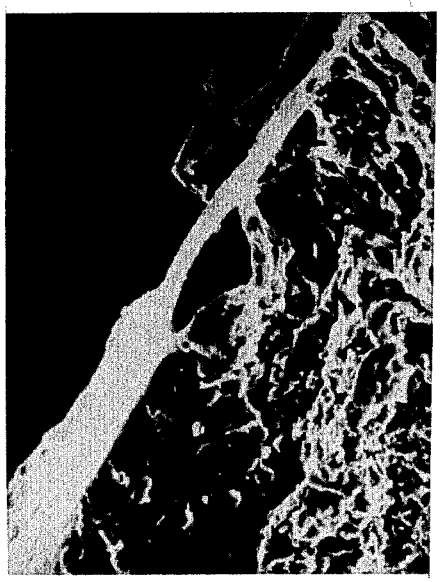
Figure 6C:
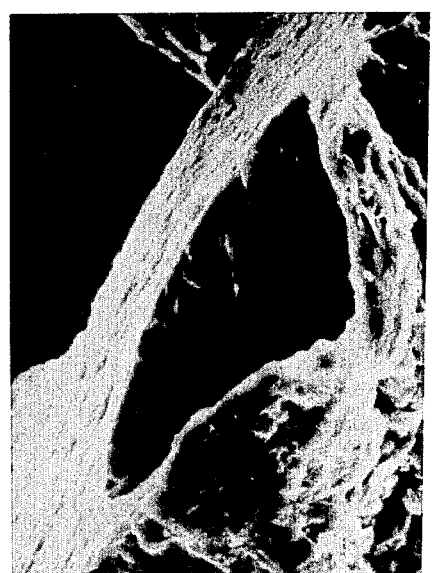
Figure 6D:
Figure 6E:
Figure 6F:
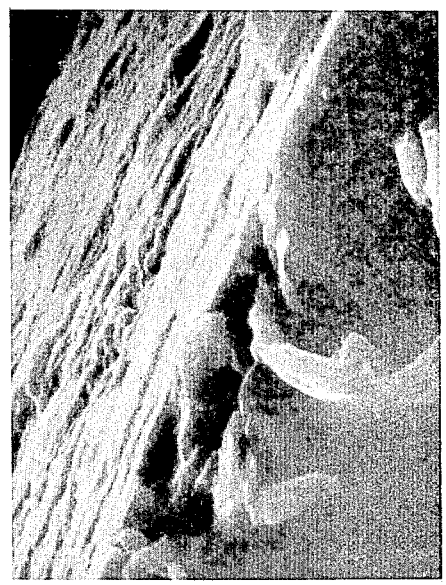
Figure 7A:
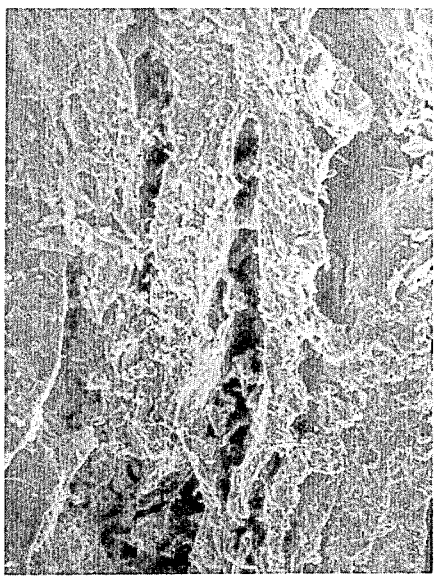
FIG. 7 represents a series of photomicrographs of the product of the prior art extrusion cooking process; 7a is taken at 50X; 7b at 100X; 7c at 300X; 7d at 500X; 7e at 1000X; and 7f at 1500X.
Figure 7B:
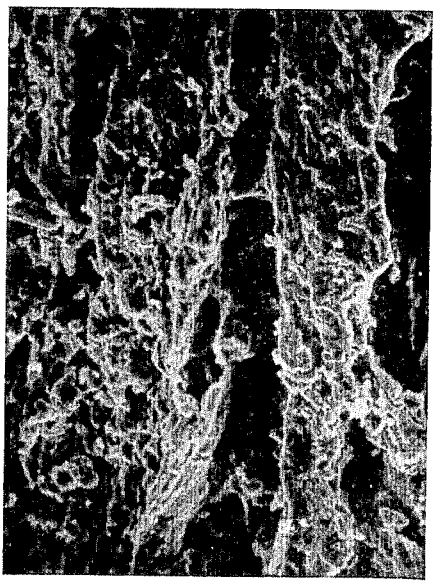
Figure 7C:
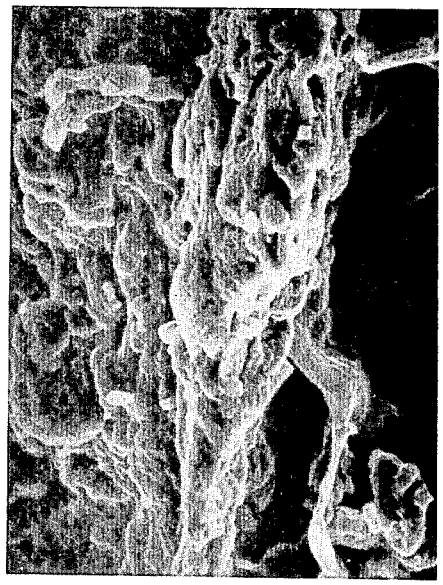
Figure 7D:
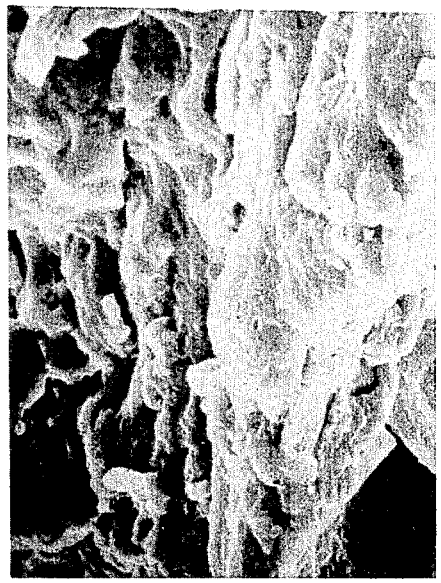
Figure 7E:
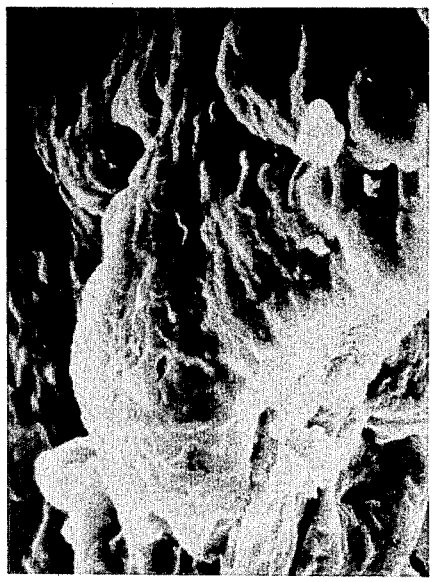
Figure 7F:

The present invention is directed to a process and apparatus for texturizing protein material. The term texturizing as used herein and widely understood in the art refers to the process of changing globular amorphous particles of protein into fibrous continuous phase protein material with structural identity.

The term retort stable as used herein refers to a product which keeps its structural integrity after treatment at elevated temperature and pressure. In the typical retort processing test about 1 part texturized protein is mixed with 10 parts of a 1% salt solution and sealed in a can. The can then is placed in a retort and subjected to a temperature of 250° F. and a pressure of 15 psig for about 60 minutes. The ability of a retorted product to maintain its structural integrity and bite characteristics can be tested by placing the product between the thumb and forefinger and subjecting the product to shear forces. A retort stable product will not disintegrate with moderate finger pressure. A product with poor retort stability will feel mushy and will fall apart when subjected to moderate shear forces.

Protein material employed in the process of the present invention should contain at least about 40% protein on a dry weight basis. Of primary interest are vegetable protein materials derived from soybean. Soy proteins can take the form of soy flour, soy concentrate, soy isolates or mixtures thereof. The process of the present invention is especially well suited to texturizing low protein materials such as soy flour. Other oilseed materials such as peanut, cottonseed, and sesame seed may also be employed. Other known protein materials such as those derived from wheat, milk, egg, single cell or leaf proteins and the like may be texturized according to the process of the present invention. Protein material employed should be viable, i.e., have a PDI (Protein Dispersability Index) in the range of from about 40 to about 90%.

Other protein sources suitable for the practice of the present invention include natural meat products. When texturizing meat proteins, the starting material employed should consist of a mixture of meat and a protein binder. Meat proteins may comprise meat scraps or pieces possessing poor textural qualities such as mechanically deboned chicken, beef, seafood, etc. or blends of the foregoing. Suitable protein binders include vegetable proteins such as soy protein or other known proteins such as those derived from wheat, yeast, milk, egg, etc. In general, mixtures containing up to about 80% comminuted meat may be texturized according to the process of the present invention.

In accordance with the preferred embodiment of the process of the present invention the protein material described above is first mixed with water to form a protein dough or paste containing from about 60 to about 73% solids. This pasty or dough-like mixture then is advanced in a passive screw feeding means. In this feed zone the product may be preheated to a relatively low temperature in the range of about 110° up to about 150° F. It will be recognized that this is a temperature below which texturization will occur. The screw feed should be of the low work type which serves mainly to advance the protein dough rather than subjecting it to severe physical working, and typically is operated at less than 50 RPMs and preferably between about 20 to 30 RPMs. Best results are achieved at about 25 RPMs.

Protein dough from the screw feed chamber then is forced under pressure through an extrusion die assembly which forms the protein into a thin sheet-like product. Applicants have found that an extruded protein product will possess better overall textural qualities if a unidirectional laminar texturization is imparted to both surfaces of the protein sheet while it is still in the die assembly. Surface texturization of the protein sheet while it is still in the die assembly has been found to build in certain unique textural characteristics to the protein structure such as retort stability, greater density and firmer bite identity.

Surface texturization as used herein is accomplished by applying external heat to both surfaces of the thin protein sheet as it passes through the die assembly. As the protein sheet passes through the die, it should contact the heated die surfaces for a time sufficient to texturize the surfaces of the protein sheet. The residence time in the die can be controlled by varying the product feed rate and/or by increasing the length of the die assembly. Generally, residence times of from about 0.3 minutes up to about 1 minute or more are satisfactory to achieve the requisite degree of surface texturization. The preferred residence time is about 0.5 minutes. The upper limit on die residence time should be less than the time at which thermal degradation begins.

The protein sheet formed in the die should be relatively thin to achieve the overall enhanced properties of the present invention. Satisfactory results have been achieved with sheet thickness of up to about ½ inch. The preferred sheet thickness is about 3/16 inch. The sheet thickness should not be so great as to have a significant adverse effect on the final product.

As used herein, the term "sheet" is intended to include (1) a flat product with length and width dimensions much greater than its thickness, like a sheet of paper; and (2) a product in which a sheet as defined above is not all in one plane, e.g., a tubular sheet formed from a flat sheet as in (1). When referring to "both" sides or surfaces of a tubular sheet, the inner and outer surfaces are intended.

In the preferred embodiment the die assembly produces a thin tubular sheet of protein. The term "tubular" as used throughout the specification and claims refers to shapes other than cylindrical tubes, such as square or triangular tubes. In the preferred embodiment, however, the tubular extrudate forms a right circular cylinder of protein dough.

Extrusion pressures developed at the orifice in the range of about 1000 to about 2000 psig are suitable in the practice of the present invention. The temperatures developed at the extrusion die are generally in the range of from about 150° to about 320° F.

The thin protein sheet having the above described textured surface is extruded directly into a first confined treating zone. In this first zone, additional texturization of the unbroken protein sheet is effected by the action of heat and pressure from the separately introduced flowing gaseous steam. The gaseous stream causes the sheet to buoy up, flex and helps convey the sheet around the inner die support. The extruded sheets are retained in the flowing stream of heated gas in the first confined zone for an extended period of time, e.g., for up to a 1½ minutes or more and this results in further texturizing. Extended residency times of up to about 0.75 min are preferred. During this period the flowing gas is extremely effective to impart textured qualities to the protein product. Moreover, this extended holding period allows a high degree of texturization to be achieved without employing an extremely long confined treating zone.

Along with the extruding forces, gravity and the gaseous stream help the protein sheet to flow into the segment cutting area disposed at the discharge end of the first confined zone. The protein sheet is cut into segments by a cutting assembly affixed to the rotating screw of a screw conveyor which conveys the segments through a second confined treating zone.

When the thin extruded sheet of protein is tubular in shape, it is preferred to longitudinally slit the tube into a plurality of individual arcuate sheets as the tube leaves the die assembly. Each of these arcuate sheets then is subjected to the gas flow and cut off in the manner described above.

In the preferred embodiment the gaseous stream is high pressure steam. Generally, any steam pressure below that which will cause the extruded protein sheet to break off before it reaches the cutting means, may be employed. In practice, it has been found that pressures of about 80 to 150 psig are suitable to accomplish this result. Best results are achieved when employing pressures in the range of from about 110 to about 120 psig. The gaseous stream may be introduced into the first confined treating zone in any manner which avoids premature breaking off of the protein sheet.

After the discrete segments of textured protein have been cut off from the proteins sheets, the screw conveyor forwards the segments through the second confined treating zone through which the heated gaseous stream introduced into the first confined treating zone also flows. In this second confined treating zone the elevated temperature, pressure and turbulence of the gas flow imparts further texture to the protein pieces and volatilizes objectionable flavor compounds.

Generally, temperatures in both the first and second confined treatment zones of up to about 350° F. are suitable to achieve texturization with best results achieved in the range of 310° to 350° F. Pressure in said confined treatment zones is regulated by a back pressure maintaining means at the discharge end of the second confined zone. Back pressures of up to about 105 psig measured at the exit port of the second confined zone should be maintained in the zones. Preferably, the back pressure is kept in the range of 60 to 105 psig. After passing through the back pressure maintaining means the protein segments can be recovered in any known manner.

One embodiment of the apparatus of the present invention now will be described by reference to FIG. 1. A mixture of protein to be texturized and water is formed in any suitable mixing means 1. The dough-like mixture from the mixing means is discharged into a screw feed chamber 2. The screw feed chamber may be unheated over most of its length and serves only to forward the dough to the extrusion die. As the protein dough nears the extrusion die some external heat may be applied by steam or hot water jackets 3 or the like.

Communicating with the screw feed chamber is an elongated die assembly 4 which is effective to extrude a thin sheet of semi-rigid protein dough. The die assembly of the preferred embodiment comprises two concentrically disposed cylindrical surfaces defining a tubular extrusion orifice. The product produced by such a die assembly is a continuous tube of protein material. As indicated above, the preferred shape of the extrusion orifice defined by the die assembly is a right circular cylinder, although other shapes may be employed.

In order to achieve a product with high textural qualities the die assembly should be equipped with provision for supplying external heat to both sides of the protein sheet. This externally supplied heat can take the form of steam jackets. When the extrudate is a tubular sheet, heat must be applied to both the inner and outer surface by steam containing areas 5 and 6 respectively. The requisite degree of texturization is not achieved when only one side of the sheet is heated.

As the thin tubular sheet leaves the die assembly, it is longitudinally sliced into a plurality of continuous arcuate sheets by a plurality of knife edge slitting means 7, as best shown in FIG. 2.

Communicating with the die/slitter assembly is a first confined treating zone 8. As the protein sheets enter this treating zone, a stream of heated gas is also introduced into the zone. This preferably is accomplished by employing the steam from die heating chamber 5 which is inside the tubular extrudate.

In the first confined treating zone 8 the protein material is subjected to the action of heat and pressure from the turbulent gas flow. Preferably, this confined treatment zone takes the form of an elongated tube or chamber. The dimensions of this tube are not critical. In practice, tube lengths of about six to ten feet generally provide suitable retention times although longer or shorter tubes may be employed satisfactorily.

At the discharge end of said first confined zone the unbroken protein sheets enter a cutting zone where they are cut into individual segments. Cutting means 9, as best seen in FIG. 3 comprises a stationary cutting edge 10 mounted at the entrance to a second confined zone 11, and a plurality of rotating cutting edges 12, mounted on a screw conveyor 13 in the second confined treating zone.

At the discharge end of the second confined treating zone is a back pressure maintaining means 14. This back pressure means can comprise, for example, a spring loaded valve, a rotary valve, or a rotary letdown pump. In general, any device which allows the product to exit the confined zone while maintaining a back pressure upstream may be employed. Suitable back pressure devices in the rotary letdown pump category include the CP-6 made by Creamery Package Co., Inc., and Model R2-4PB Foster Food Pump made by Foster Pump Works. The product issuing from the back pressure means may be subjected to recovery by any known means. Since the product is essentially dry, it is only necessary to forward the steam/protein mixture to a zone where the steam can be vented off.

The product produced by the process of the present invention comprises sheet-like segments of protein material having structural and eating properties similar to animal meat products.

This product consists of two discrete regions. A cross section of a portion of the extruded protein sheet of the present invention is shown in the photomicrograph of FIG. 4. At the surface of the sheet, shown at the right of the picture, is a layer of dense fibrous protein material oriented in one direction. This surface orientation is achieved by the special surface texturizing performed in the extrusion die according to the present invention. The interior portion of the sheet-like product of the present invention is a dense protein matrix containing an open spherical cell development.

The interior porous structure of this product is best shown in the series of photomicrographs in FIG. 5. This unique system of spherical voids surrounded by a dense fibrous matrix provides randomly spaced shear points which give way upon chewing to provide bite and mouth feel characteristics which simulate natural meat products.

The laminar surface texturization of the product of the present invention is best shown in the series of photomicrographs which make up FIG. 6. This dense fibrous skin is formed on both sides of the product where the sheet touches the heated die surfaces.

By way of contrast, the product produced by the prior art extrusion cooking process described above is shown in FIG. 7. This product exhibits a structure comprising layers of protein separated by an elongated oval void system. Note also that the matrix is not very dense.

Furthermore, the product of the present invention is free from objectionable flavor notes which in themselves often made prior art products unacceptable to humans. The severe working, temperature, and pressure conditions present in the prior art extrusion cooking processes are believed to generate certain off flavors not produced in the relatively passive treatment of the present invention.

The severe conditions of the prior art processes are also believed to adversely affect the color and nutritional value of the finished product. The product produced according to the present invention possesses excellent color and nutritional stability. Another advantage achieved by the process and apparatus of the present invention lies in the retort stability of the product. Due to the unique structure imparted by the combination of surface texturizing in the die followed by steam texturizing in the confined zone, the protein product formed in accordance with this invention may be processed by conventional food preparation techniques without thermal degradation of its physical or organoleptic properties.

Products produced by the process of the present invention find utility in a number of food processing fields. These texturized protein products may be cut into portions suitable for direct incorporation into canned or frozen foods. The texturized products may also be employed as a filler or extender in ground meat products. It is also possible to produce fabricated nutrients from the protein material produced according to the present invention.

The process of the present invention is also useful to provide upgraded or restructured natural meat products. Meat scraps or by-products with little or no food value (due to their poor structural characteristics) can be texturized according to the process of the present invention to provide chicken, crabmeat, etc. cubes with good texture and mouth feel.

The following specific examples are intended to illustrate more fully the nature of the present invention without acting as a limitation on its scope.

EXAMPLE 1

Over 5,000 pounds of the product of the present invention were produced at approximately 360 pounds per hour of finished product at less than 10% moisture with an input dough moisture of approximately 30% at 468 PPH. Soy flour obtained from Central Soya, Chemurgy Division known as Soyafluff 200W with a minimum of 50% protein of which 60–70% of this protein was water-soluble was used. Dough thickness in the die was 0.187 inches which caused up to 2,000 psig dough pressure in the die. Low throughput product rate and over texturizing and burnt flavor in the product was observed. Steam pressure in area 5 (FIG. 1) was 75 to 78 psig. Steam pressure in area 6 (FIG. 1) was 70 to 73 psig. Steam pressure in areas 8 and 11 (FIG. 1) were 70 to 73 psig. Product temperature was maintained 315° to 316° F. in the pressure zones. The retention screw rotated at 68 to 52 RPM. The rotary valve rotated at 91 to 70 RPM, as the valve and screw are driven by the same motor the valve speed will be 1.35 times screw speed. The textured material out of the rotary valve flashed when discharged to atmospheric pressure. The gases were drawn off with an exhaust system and the product was conveyed to a dryer. An inlet temperature of the dryer was 308° to 320° F. The dried material was then ground to a practical size 100% through a U.S.S. 6-mesh screen and 53 to 60% retained on a U.S.S. 20-mesh screen. This grind size will vary when different grinder screens and speeds are used. The ground product was conveyed by cooled air to reduce the temperature of the product below 100° F. for bagging. The inside diameter of the outer die was approximately 8.0 inches the inner die outside diameter can be machined to a diameter to obtain the desired dough thickness. The length of the die dough heating section is 24 inches long. The longitudinal slitter makes 24 cuts, resulting in the product strands having a width of approximately one inch. The strands stayed intact until they extend down to the screw conveyor knife area where they were cut within an arbitrary length according to the screw speed and extrusion rate. This cut length can be varied from ⅜ inch to 3 inches long and was then conveyed under pressure to the discharge valve approximately 48 inches where it was discharged on to a conveyor belt at atmospheric pressure, conveyed to the dryer, grinding, and bagging system.

EXAMPLE 2

In this example the dough thickness was increased to 0.250 inches thus increasing the product die rate to 780 pounds per hour, reduced the product pressure in the die to 1,300 psig and maintaining all other conditions as given in Example #1. The resulting product was found to possess excellent retort stability plus good texture and flavor characteristics.

EXAMPLE 3

In another example the dough moisture was increased to 33.6% $H_2O$ with a resulting decrease in the product die pressure to 1,150 psig with the product rate decreasing from 780 to 624 pounds per hour. Soyafluff 200W was used. The steam pressure in area 5, 6, 8 and 11 (FIG. 1) was increased to 80 psig each to maintain a 320° F. product temperature in the pressure zones. The oven temperature was decreased to 300° F., maintaining the product moisture below 10% moisture. A chunk product resembling sliced meat was produced which also exhibited good retort stability and quality.

EXAMPLE 4

In this example the dough thickness was increased to 0.281 inches in the die. The average dough moisture in the die was 32.0% $H_2O$ which increased the die product throughput rate to 1,237 PPH and reduced the die pressure to 1,000 psig. Soyafluff 200W was also used. The product temperature in the pressure zones was 335° F. with the steam pressure in the zones at 105 psig. The finished product moisture was less than 10% $H_2O$ and the oven temperature range was reduced to 275° to 280° F. Satisfactory textured and flavored product was obtained.

While certain specific embodiments of the invention have been described with particularity herein, it should be recognized that various modifications thereof will occur to those skilled in the art. Therefore, the scope of the invention is to be limited solely by the scope of the claims appended hereto.

We claim

1. Apparatus for texturizing protein material comprising:
   (a) die means for extruding a continuous, relatively thin sheet of semi-rigid protein material having opposed external surfaces;
   (b) heating means adjacent to said die means for directly heating said die means to effect surface texturization of both of said surfaces of said thin sheet as it passes through said die means;
   (c) means defining a first confined treating zone communicating with said die means;
   (d) means for introducing a heated gaseous stream into said first confined zone to effect additional texturization;
   (e) means for cutting said extruded sheet into segments disposed at the discharge end of said first confined treating zone;
   (f) means defining a second confined treating zone communicating with said first confined treating zone; and
   (g) means for recovering said texturized protein material.

2. The apparatus of claim 1 additionally comprising low-work screw feed means communicating with said die means.

3. The apparatus of claim 1 wherein said die means defines a tubular shaped orifice, said apparatus further comprising means for longitudinally slitting an extruded tubular sheet into a plurality of continuous arcuate sheets, said slitting means disposed at the entrance to said first confined zone.

4. The apparatus of claim 3 wherein said die means comprises two concentric cylindrical shaped surfaces defining a right circular cylindrical orifice.

5. The apparatus of claim 1 additionally comprising means for maintaining back pressure disposed at the discharge end of said second confined treating zone 6. Apparatus for texturizing protein material comprising:
   (a) means for mixing a source of protein and water to form a protein dough;

(b) means for advancing said dough without imparting excessive work to said dough;

(c) die means for extruding said dough in the form of a continuous relatively thin sheet of semi-rigid protein material having opposed external surfaces;

(d) heating means adjacent to said die means for directly heating said die means to effect surface texturization of both of said surfaces of said thin sheet as it passes through said die means;

(e) means defining a first confined treating zone communicating with said die means;

(f) means for introducing a heated gaseous stream into said first confined zone to effect additional texturization;

(g) means for cutting said extruded sheet into segments disposed at the discharge end of said first confined treating zone;

(h) means defining a second confined treating zone communicating with said first confined treating zone;

(i) means for conveying said segments through said second confined treating zone;

(j) means for maintaining back pressure disposed at the discharge end of said second confined zone, said back pressure means maintaining a predetermined back pressure in said first and second confined zone; and (k) means for recovering said texturized protein material.

7. The apparatus of claim 6 wherein said means for advancing comprises a low-work screw feeder.

8. The apparatus of claim 6 wherein said die means defines a tubular shaped orifice, said apparatus further comprising means for longitudinally slitting an extruded tubular sheet into a plurality of continuous arcuate sheets, said slitting means disposed at the entrance to said first confined zone.

9. The apparatus of claim 8 wherein said die means comprises two concentric cylindrical shaped surfaces defining a right circular cylindrical orifice.

* * * * *